S. W. BARR.
COMBINED POTATO-DIGGER AND CULTIVATOR.

No. 173,753. Patented Feb. 22, 1876.

UNITED STATES PATENT OFFICE.

SAMUEL W. BARR, OF MANSFIELD, OHIO.

IMPROVEMENT IN COMBINED POTATO DIGGERS AND CULTIVATORS.

Specification forming part of Letters Patent No. 173,753, dated February 22, 1876; application filed January 10, 1876.

*To all whom it may concern:*

Be it known that I, SAMUEL W. BARR, of Mansfield, in the county of Richland and State of Ohio, have invented a new and useful farm implement—a Combined Potato Digger and Cultivator—which machine is fully described and set forth in the following specification, reference being had to the accompanying drawing.

Figure 1:
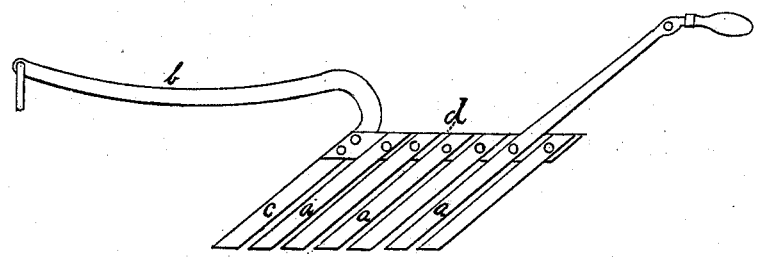

In the construction of this machine an iron bar, four feet long and five-eighths by two inches thick, is drawn out at one end to form the beam $b$, Fig. 1. The other end is beveled, and at a point twenty inches from the end the bar is bent upon one edge till the end $c$ is at an angle of forty-five degrees to the beam. The front tooth of the machine is formed by this strong bar $c$, Fig. 1, and at a point eighteen inches from the end two castings, $d$, Fig. 2, with beveled ends, are bolted fast, and diverge from this point on either side to form the frame. A rod, $e$, with its ends flattened, drilled, and turned at right angles, is bolted fast to the castings to make the frame substantial.

Figure 2:
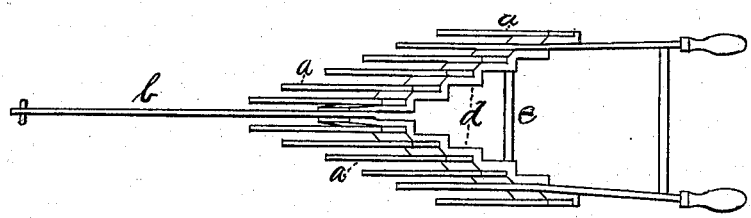

These castings are about two feet long and one-half inch thick by three inches broad, and are formed with steps or seats, as seen at $d$, Fig. 2. These seats are parallel with the beam $b$, and run from edge to edge of the castings at an angle of forty-five degrees, and to the angles of these seats the teeth $a\,a\,a$ are bolted fast. The blades or teeth $a\,a\,a$ are cut from bars of steel or iron three-eighths of an inch thick by one and a half inch broad, and are seventeen inches long, with beveled ends. These teeth, when bolted to the frame, stand at an angle of forty-five degrees to it, with their sides parallel to the beam $b$, and are set close enough in succession from the front and center of the machine to prevent potatoes from passing between them.

Ten or twelve teeth are used in a medium-sized machine, and the above dimensions apply to the construction of a machine of medium size. The rear end of the frame is seventeen inches wide, which is deemed wide enough for ordinary potato-hills. When used to dig potatoes the machine must be run through the center of the hill with the points of the teeth below the tubers, in which case no damage will be done to them.

This machine differs from all potato-diggers that use a share or shovel, in the fact that it does not lift any dirt from below the tubers to be thrown out with them to cover more or less. When used as a cultivator it may be necessary in some soils to take out alternate teeth, in which case the machine can be run very close to young plants, and will loosen the soil as deep as desired.

I claim—

The teeth $a$, beam $b$, and front tooth $c$, in combination with the side beams $d$, the teeth being beveled at their lower ends, as shown, and secured to the beams $d$ at an angle of about forty-five degrees, with their flat sides parallel with the line of draft, as shown and described, and for the purpose set forth.

SAMUEL W. BARR.

Witnesses:
F. W. WAGNER,
WM. LONGSDORF.